(12) United States Patent
Raynal

(10) Patent No.: US 7,931,434 B2
(45) Date of Patent: Apr. 26, 2011

(54) DEVICE FOR PRODUCING MECHANICAL ENERGY BY MEANS OF A DIVERGENT, TELESCOPIC AND AUTO SUSTAINED CHIMNEY

(76) Inventor: Marc Raynal, Mata Utu Wallis (FR)

( * ) Notice: Subject to any disclaimer, the term of this patent is extended or adjusted under 35 U.S.C. 154(b) by 509 days.

(21) Appl. No.: 12/096,608

(22) PCT Filed: Jun. 5, 2007

(86) PCT No.: PCT/FR2007/000922
§ 371 (c)(1),
(2), (4) Date: Jun. 8, 2008

(87) PCT Pub. No.: WO2008/009785
PCT Pub. Date: Jan. 24, 2008

(65) Prior Publication Data
US 2008/0292456 A1    Nov. 27, 2008

(30) Foreign Application Priority Data

Jul. 17, 2006 (FR) ..................... 06 00717
Jul. 17, 2006 (FR) ..................... 06 06462

(51) Int. Cl.
*F03D 9/00* (2006.01)
(52) U.S. Cl. ............ 415/2.1; 415/4.1; 415/4.2; 415/4.4; 290/44; 290/55
(58) Field of Classification Search ............ 415/2.1, 415/4.1, 4.2, 4.4; 290/44, 45, 54, 55
See application file for complete search history.

(56) References Cited

U.S. PATENT DOCUMENTS

| | | | | |
|---|---|---|---|---|
| 1,612,838 A | * | 1/1927 | Schutz | 415/909 |
| 4,036,916 A | * | 7/1977 | Agsten | 415/170.1 |
| 4,070,131 A | * | 1/1978 | Yen | 415/4.4 |
| 4,421,452 A | * | 12/1983 | Rougemont | 415/4.2 |
| 4,508,973 A | * | 4/1985 | Payne | 290/55 |
| 4,963,761 A | * | 10/1990 | Wight | 290/55 |

(Continued)

FOREIGN PATENT DOCUMENTS

BE    854948 A2    9/1977

(Continued)

OTHER PUBLICATIONS

EPO International Search Report on this application (PCT/FR2007/000922) completed Sep. 13, 2007.

(Continued)

*Primary Examiner* — Igor Kershteyn
(74) *Attorney, Agent, or Firm* — Louis Ventre, Jr.

(57) ABSTRACT

A telescopic chimney and methods are disclosed for generation of mechanical energy using air routed through a turbine. Truncated cones stored nested together telescope to interlock when extended end to end to form a conical shape that diverges upwardly. An air output deflector at the exit of the chimney drives the exiting airflow downwards and is optionally divided into six equal radial spans so that airflow can be varied through each by a computer-controlled shutter to compensate for wind forces. An axial cable raises and lowers truncated cones. A method of deploying the chimney includes steps of closing the shutters; filling the truncated cones with heated air; controlling the rise of the truncated with the cable; and, opening the shutters. A method of collapsing the chimney includes the steps of pulling the cable to exert downward force on a truncated cone.

7 Claims, 7 Drawing Sheets

U.S. PATENT DOCUMENTS 5,982,046 A * 11/1999 Minh .............................. 290/55
6,590,300 B1 * 7/2003 Preito Santiago .............. 290/55
7,400,057 B2 * 7/2008 Sureshan ........................ 290/55

FOREIGN PATENT DOCUMENTS

| CA | 2466189 A1 | 11/2005 |
|---|---|---|
| FR | 2307982 A | 12/1976 |
| WO | WO 2004/036039 A | 4/2004 |
| WO | WO2006/022590 A | 3/2006 |

OTHER PUBLICATIONS

Lodhi Mak: "Application of helio-aero-gravity concept in producing energy and suppressing pollution," Energy Conversion and Management, Elsevier Science Publishers, Oxford, GB, vol. 40, No. 4, Mar. 1999, pp. 407-421, XP004143655, ISSN: 0196-8904.

* cited by examiner

DEVICE FOR PRODUCING MECHANICAL ENERGY BY MEANS OF A DIVERGENT, TELESCOPIC AND AUTO SUSTAINED CHIMNEY

TECHNICAL FIELD

The present invention relates to a device for producing mechanical energy by means of a divergent chimney, telescopic and auto sustained, made from composite materials. The tilted walls of the chimney are shaped to be widened towards the top, and exert on the internal airflow, a thrust well above the buoyancy, leading the turbine to speeds near to 100 m/s. The low pressure of the air in the chimney, allows the self-lifting of the whole device.

BACKGROUND ART

The principle of generating electricity from the warm air near the ground, channeled into a chimney and ejected at an altitude is known and in particular was the subject of research in Spain and Australia ("solar-tower program"). A 195 m height experimental tower was set up in Manzanares, south of Madrid, and functioned by producing an average power of 50 kW between 1986 and 1989 with a reliability rate of 95%.

The process used consists in making the air pass in a prestressed concrete chimney of straight cross-section, and collecting, by means of a turbine coupled to an alternator, part of the energy of the internal airflow perpetually set in motion by the buoyancy, resulting in the difference between the density of the air located outside and that of the warmer and lighter air channeled inside.

The Australian project was followed a few years later by a 1000 m high tower which had its share of technical difficulties, in particular with respect to the constraints of construction in terms of great height and the seismic requirements as well as a very significant cost of about 500 to 750 million dollars US.

Other similar inventions have since originated all over the world, but have implemented only the buoyancy aspect and presented the major disadvantage of requiring an expensive structure to get the necessary and sufficient height for this operation, which can be estimated from 200 to over 1000 meters.

SUMMARY OF INVENTION

The advantages provided by this invention, compared to the known techniques to recover the buoyancy being exerted on the warm air passing through a chimney are as follows:

1) The thrust exerted by the tilted walls on the hot indoor airflow, is more than 1000 times higher than the buoyancy on the same airflow moving upwards in the chimney. This results in air speeds of more than 100 m/s at the turbine level installed at the pass, before the input of the chimney, which very much exceeded the result of widely conducted earlier experiments using only buoyancy, which recorded speeds of about 15 m/s. The energetic efficiency is thus increased tenfold.

2) The chimney is auto-sustained in the air and does not require costly structure of concrete or other materials to remain deployed, and can be easily located anywhere, including above the sea (with condition of being sheltered from sea swells) or in seismic zone. This advantage results from the permanent depression prevailing inside the chimney at any level, from the pass located at the turbine to the exit of the air at altitude. As a result of this pressure difference, which the outdoor air exerts on the tilted walls of the chimney, a thrust upwards strong enough to compensate the thrust downwards of the indoor airflow moving upwards, is added to the weight of the structure of the chimney. The pressure difference generates a thrust upwards stronger than the weight of the chimney added to the thrust downwards of the air moving up against the walls of the chimney.

3) The lower air pressure, which prevails inside the chimney for any altitude, is the result of the energy taking on the airflow when it goes through the turbine at the pass and of the acceleration of the air channeled into the chimney through the intake duct having a convergent shape.

4) The chimney is telescopic, allowing its ground assembly, without costly work of great height, as well as its deployment from the ground and its folding, from the ground particularly for maintenance or during bad weather.

DETAILED DESCRIPTION

Figure 1:
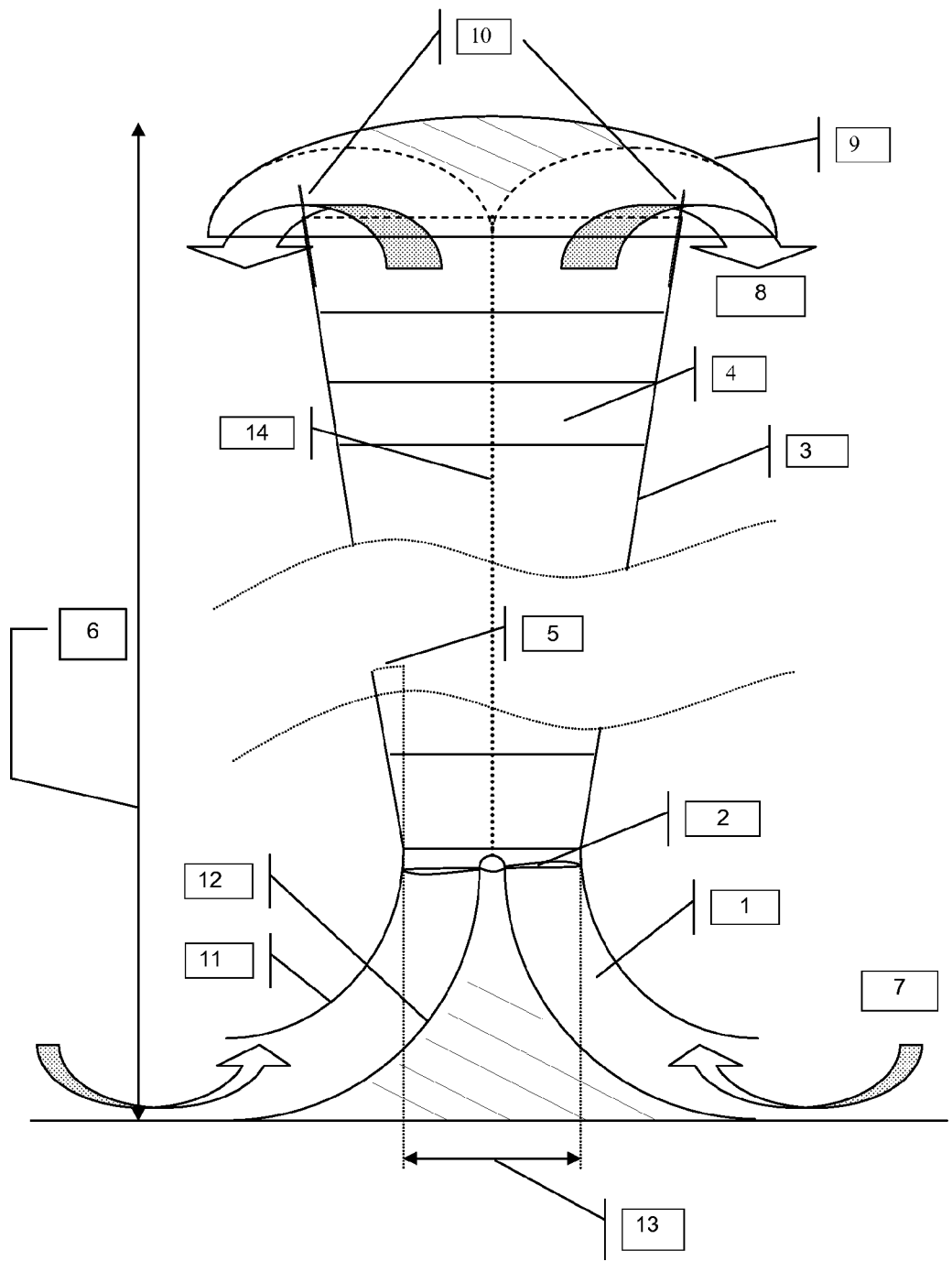
FIG. 1 is a sectional view of the device.
Figure 2:
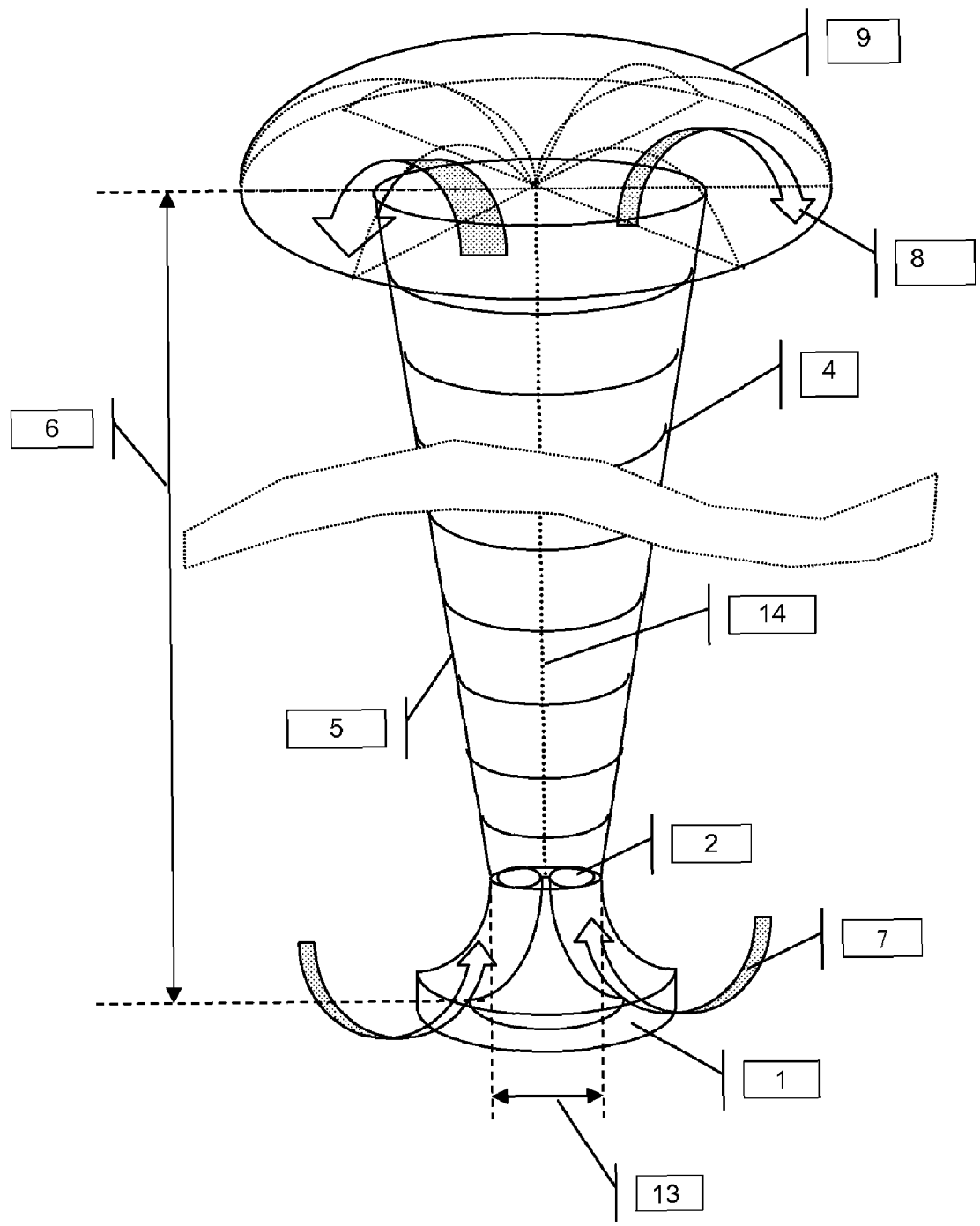
FIG. 2 is a perspective of the deployed device.

The present invention comprises an extremely lightweight chimney, mainly made up of composite materials (fiberglass, carbon or other materials, resistant to sunning), which can float in the air and deliver a useful output of a few hundred of mega-watts (see FIGS. 1 and 2).

The use of these materials confers a great lightness and a sufficient rigidity to the chimney, allowing it to preserve its shape notwithstanding the effects of its own weight and the involved aerodynamic loads.

FIG. 1 illustrates the body of the chimney (3) that is telescopic and composed of truncated cones (4) joined end to end when operating in steady state. The highest element of the chimney (3) is a deflector for output, which is shaped as a half-torus opened downwards (9). The chimney is thus formed of:

A divergent section whose angle varies between 1 and 5 degrees compared to its central axis,
A height (6) of several hundred meters and a diameter (13) of a few tens of meters.

Figure 3:
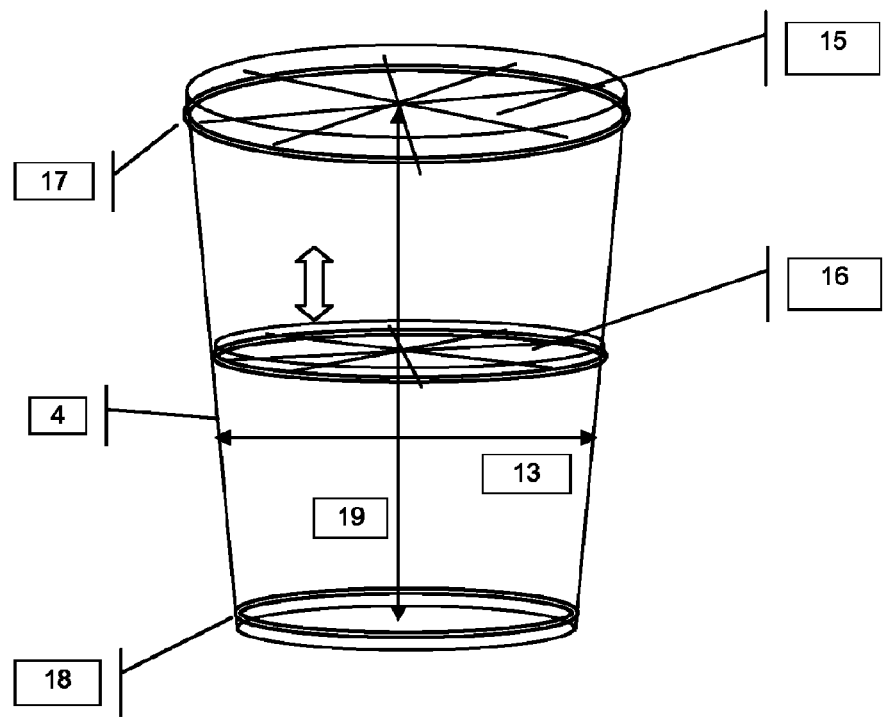
FIG. 3 is a perspective of a telescopic element.

Telescopic elements of the chimney are subjected to the pressure of the external atmosphere, higher than that of the internal air. As shown in FIG. 3, the telescopic elements are stiffened by a horizontal fixed wheel of composite materials (15) installed at their top end. The horizontal fixed wheel is prestressed like a bicycle wheel, and one or more intermediate wheels of the same type, movable vertically (16), to reinforce the current section of each element (4). The intermediate wheels move down vertically in a housing provided for this purpose during deployment, and move up below the fixed wheel during the interlocking of the telescopic elements, which occurs during the folding of the chimney (see FIG. 5).

Figure 5:
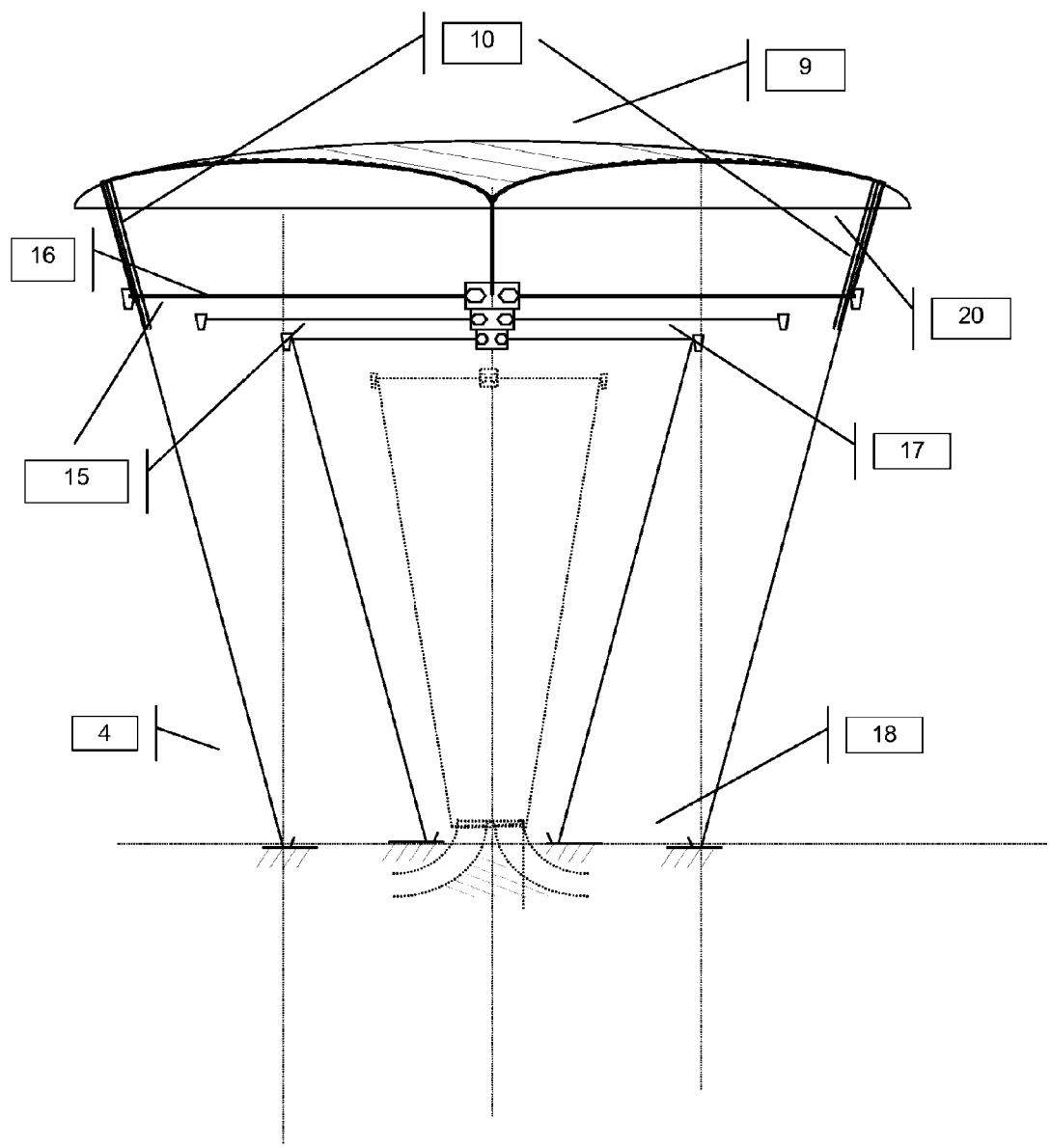
FIG. 5 is a detail of two telescopic elements encased one in another.
Figure 6:
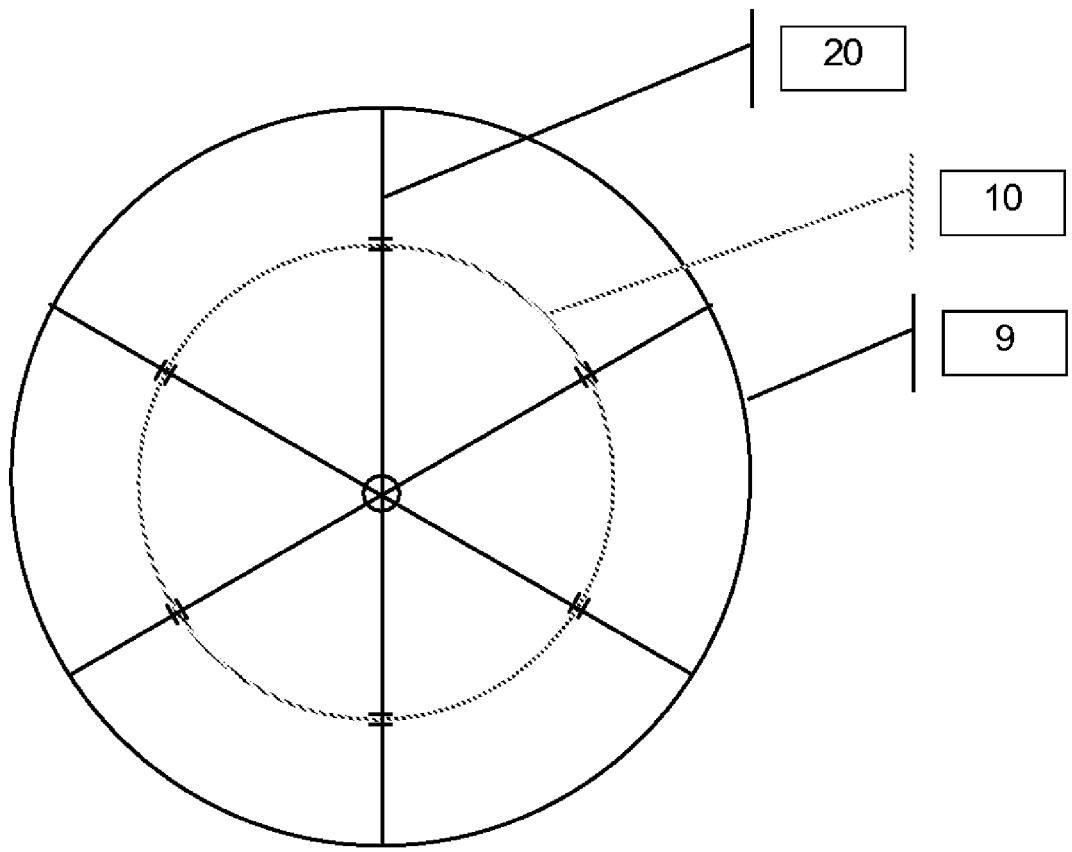
FIG. 6 is a top view of the lower part of a deflector.
Figure 8:
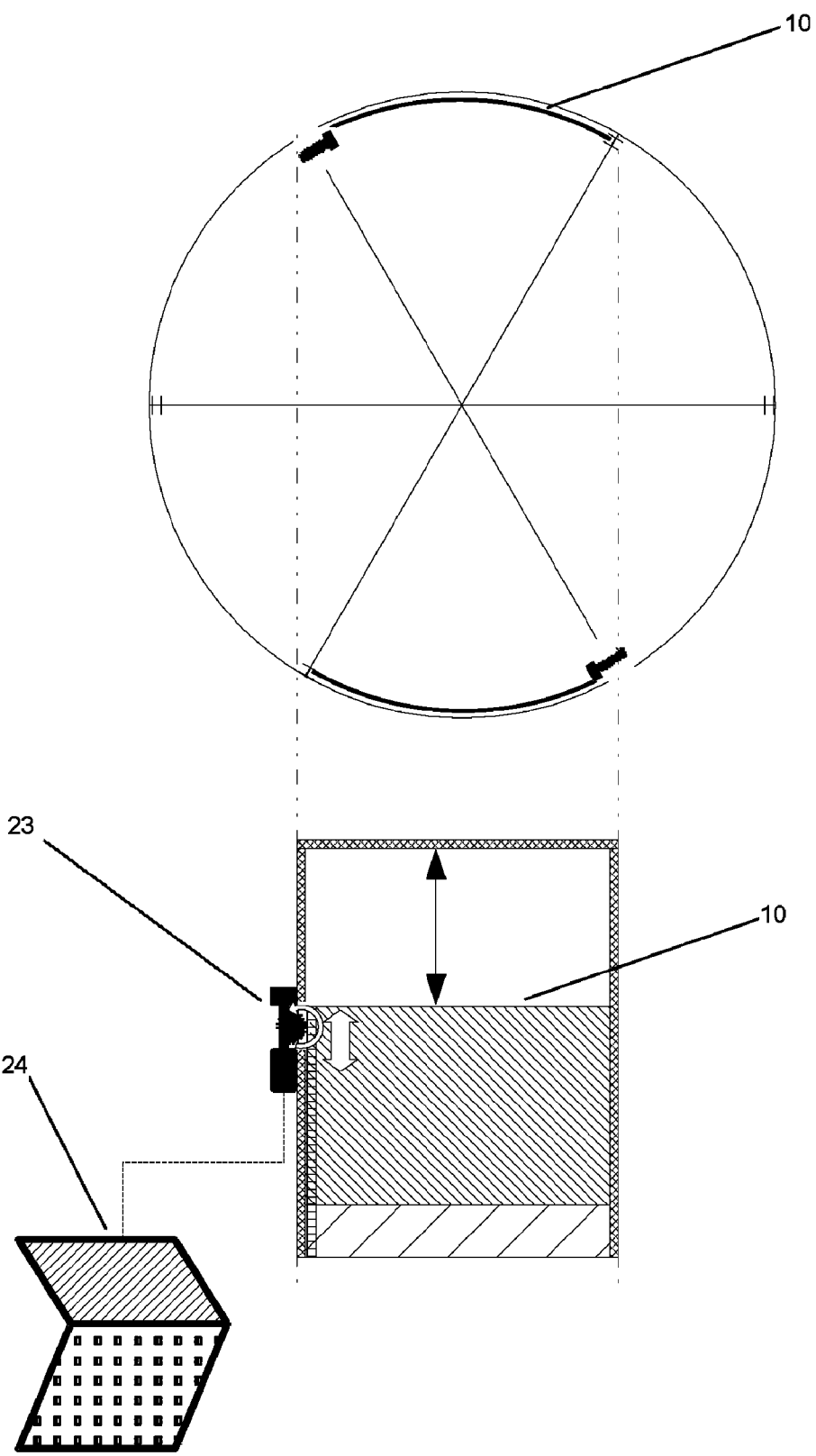
FIG. 8 is a detail of the sliding shutters controlled by a computer.

As shown in FIG. 5, the deflector output (9) is attached to the last element through six vertical walls (20) to transmit to the peripheral skin of the chimney, the force exerted by the fluid in motion on the deflector output. The vertical walls (20) are arranged in six radial spans to guide the airflow to the exit in a way that minimizes the loss of load. As shown in FIG. 8, six interior electric shutters (10) sliding from top to bottom to open and close each air outlet with a good tightness. The six air outlets also regulate the airflow direction so as to guide the head position of the chimney according to the lateral wind, to which the chimney is subjected throughout its height.

Under the effect of aerodynamic forces, including the upward thrust exerted on the deflector output (9), the telescopic elements of the chimney are kept under vertical tension. The vertical tension is sustained through the peripheral walls of the chimney. As shown in FIG. 2, a non-taut cable (14) is positioned vertically along the axis of the chimney from the last element to the ground where it can be pulled by a winch (not represented). This cable (14) includes thrust collars (21), one on the level of each fixed wheel, which are engaged against a diaphragm (22) attached to each wheel to pull downwards each telescopic element. This cable is operable to implement downward force on the element closest to the ground during the deployment and folding phases.

The intake duct (1), as shown in FIG. 1, has an overall convergent section. It is delimited by two superimposed 3D-surfaces (11) and (12), generated by the rotation of a quadrant around the axis of the chimney. The lower surface (12) is reinforced at the central level because it is subjected to the thrust of the air entering the intake duct; the airflow first follows a radial direction towards the axis of the chimney then shifts to an upward direction parallel with the axis of the chimney.

The upper surface (11) is fixed at lower surface by means of six vertical walls laid out and distributed radially. The six vertical walls have a double function to fix together the lower and the higher surfaces, and to channel the air towards the pass of the chimney in reducing as much as possible the loss of load.

Mechanical energy is collected by means of a turbine (2). The turbine is horizontally laid out at the level of the pass separating the intake duct (1) from the body of the chimney (3). This arrangement collects energy where the air velocity is the highest, which maximizes output.

In reference to the figures, the numbers correspond to components as follows:
1. Intake duct
2. Turbine
3. Divergent chimney
4. Telescopic element made of composite materials, 0.2 to 2 cm thickness
5. Angle from 1° to 5°
6. Height from 200 to 1,500 m
7. Warm air
8. Cooled air
9. Deflector in the shape of half-torus open on its lower face
10. Motorized sliding shutters
11. Upper 3D-Surface of the intake duct
12. Lower 3D-Surface of the convergent intake duct fixed on the ground
13 Diameters from 10 to 50 m
14. Cable of traction of the telescopic elements
15. Fixed wheel, made of composite materials bound with (17) below
16. Intermediate wheel made of composite materials
17. External fixing between two elements
18. Interior fixing between two elements
19. Height of a telescopic element from 10 to 20 m
20. Vertical walls of the exit duct
21. Thrust collar
22. Diaphragm
23. Electric motor on the shutters
24. Computer Method of Operation When the movement of the interior chimney air has reached steady state, the acceleration of the air in the intake duct of convergent shape, and its passage through the turbine creates low pressure in the chimney compared to exterior air. This pressure difference between the air pressure of the exterior and the interior air exerts on the entire perimeters of the inclined walls of the chimney, a thrust upwards which allows the lift of the chimney owing to the fact that it consists of light materials, made stiff by composite materials.

Deployment

The process of lifting of the chimney is as follows: all the elements are settled on the ground, by nesting one element inside the other (cf. FIG. 5). The last element, topped by the deflector, includes all the others. As shown in FIG. 5, the last element which is the top element encases all the elements when the device is folded.

The last element surmounting the deflector is filled with heated air which cannot escape for, at the starting, the sliding shutters are maintained in high position (FIG. 5) ensuring a sealed closure.

Figure 4:
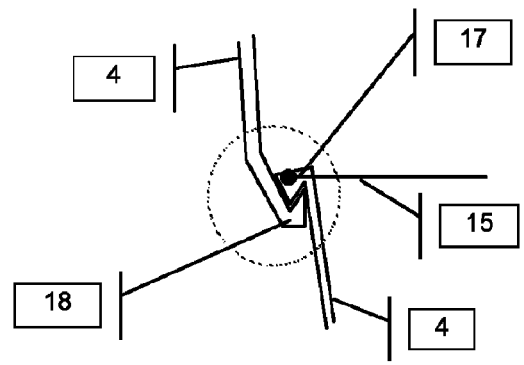
FIG. 4 is a detail of the junction between two telescopic elements.

Because of difference in density between the outdoor air and the hot air within the last element, the chimney is subjected to a buoyant force, like a hot air balloon, and undergoes an upward movement. When the upper element has risen sufficiently, it fixes itself along the higher edge of the following lower element (FIG. 4), a joint seals the junction between the two elements, the buoyant force raises two elements at a time in sequence until all the elements have been raised. The first element remains fixed at the level of the pass so as to ensure that the chimney is sealed, which is of primary importance, to maintain a lower air pressure within the chimney and to ensure its lifting.

When all the elements have been raised in the air, the sliding shutters (10) of the last telescopic element, under the exit deflector (9) are completely opened in order to let the air escape. The hot air (8) contained within the chimney escapes through the top, and thus permits transit of the warm air (7) from the ground through the chimney.

Steady State

Air located close to the ground is channeled in the intake duct (1) divided into six equal radial spans to reduce the loss of load in the entry, and is guided in radial movement towards an upward vertical movement.

The air actuates a turbine (2) horizontally laid out at the level of the pass of the chimney at the exit of the intake duct.

At the exit of the chimney, the air (8) is channeled in the deflector shaped as a half-torus opened on its lower face, divided by six equal spans. The division in six spans directs the air to the exit with a minimum loss of load. The shape of the deflector in a down-opened half-torus (9) drives the air downwards and thus provides thrust necessary to lock the entire structure together.

The outgoing airflow is adjusted according to the directions of each of the six spans by means of the sliding shutters (10) actuated with an electric motor (23). Thus, the airflow direction at exit is adjustable on request to create a horizontal thrust at the top of the chimney necessary to compensate for wind forces exerted on the chimney's entire height. The outgoing airflow direction is controlled from the ground by a computer (24).

This device must be set up in a warm area to avoid the risk of deposit of ice, Ice deposits would increase the weight of the structure jeopardizing its aerodynamic stability.

The intake air speed and the power retained by the turbine are controlled so as to preserve a positive temperature (in Celsius degrees) to avoid any risk of deposit of ice inside the structure.

Folding Up

For maintenance operation or during very bad weather, the telescopic elements (4) are brought back to the ground, by means of the cable (14) of composite material, which is positioned along the axis of the chimney. The cable, connected to each fixed wheel (15) by a device like thrust collar against diaphragm, exerts a traction only on the telescopic element nearest to the ground. The higher elements up to the deflector output are maintained in traction throughout the descent by their peripheral walls.

Figure 7:
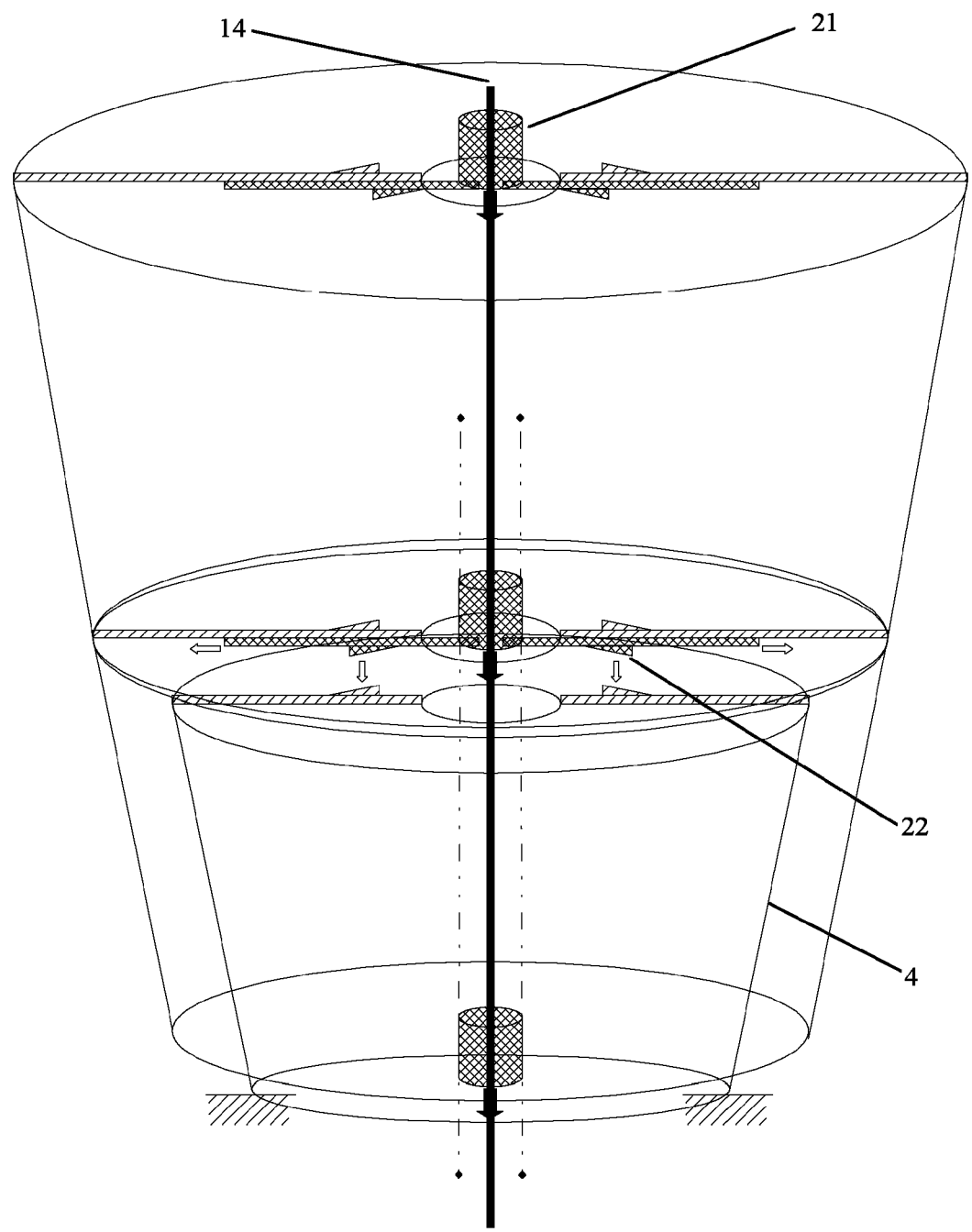
FIG. 7 is a detail of the thrust collar and diaphragm functioning.

When each element touches the ground, a device opens the diaphragm (22), which releases the thrust collar and allows the cable to continue its descent. (See FIG. 7) At this stage the diaphragm of the higher element is put in traction and pulled downwards, disuniting it from the element on the ground to which it was fixed. And so on to the last element.

This maintains the structure in traction throughout its descent by the fact that the air is guided downwards at the level of the deflector output, retaining control of the process of folding up at any point in time.

During this phase, the speed of the inlet air in the chimney is maintained by the turbine, which provides the necessary energy to the airflow, so as to ensure the safety of the folding-up operation.

INDUSTRIAL APPLICATIONS

The present invention produces electricity from a completely renewable energy source, without producing any industrial waste or any greenhouse effect.

It is particularly adapted to the warm areas of the world, away from the risk of freezing. It can function without interruption with a minimum of human intervention related to its monitoring and the delicate operations of deployment and folding up.

It can be established in any place with just the infrastructure necessary for the setting up of the intake duct, which needs an area on the ground ranging between 45 and 100 meters in radius. It can be established on the sea if it is sheltered from sea swells. In this case it can be coupled with a hydrogen plant for hydrolysis of seawater.

The present invention is equipped for example with a chimney of 500 m height and 15 m radius at the pass, and can produce between 200 and 400 MW on request. It is thus possible with this means to adjust the level of production to that of consumption, complementing large-scale electricity production.

The invention claimed is:

1. A telescopic chimney for the generation of mechanical energy using air comprising:
    a body comprising truncated cones nested together, the truncated cones that are:
        raised in the air and joined end to end;
        interlocked when extended end to end to form a conical shape that diverges up; and
        lowered to the ground for maintenance by telescopically folding together;
    a convergent intake duct fixed on the ground comprising an air intake exit end;
    a turbine at the air intake exit end of the intake duct and operable to collect energy from passage of air through the turbine; and
    an air output deflector at the topmost truncated cone of the chimney, driving exiting airflow downwards.

2. The telescopic chimney of claim 1 wherein the convergent intake duct is divided into six equal radial spans.

3. The telescopic chimney of claim 1 further comprising
    a top wheel horizontally fixed at the top of each truncated cone;
    an intermediate wheel horizontally disposed and movably connected to the truncated cone for vertical movement when the chimney is raised or lowered;
    a thrust collar against diaphragm device; and
    a cable positioned vertically along the axis of the chimney from the top truncated cone to the ground and attached to each fixed wheel through the thrust collar against diaphragm device such that the thrust collar against diaphragm device exerts a traction only on the telescopic cone nearest to the ground and releases traction when that truncated cone touches the ground.

4. The telescopic chimney of claim 1 wherein a truncated cone is made of a material selected from the group consisting of: composite, fiberglass, and carbon.

5. The telescopic chimney of claim 3 further comprising:
    six sliding shutters dividing the air deflector output deflector into six radial spans, wherein each sliding shutter is operable to regulate airflow through it so as to compensate for wind forces;
    an electric motor operably connected to the shutters; and
    a computer on the ground operably connected to the electric motor to control the shutters.

6. A method of using the telescopic chimney of claim 5 involving its deployment for producing mechanical energy starting from a position wherein the truncated cones are in a collapsed state comprising the steps of:
    closing the shutters;
    filling the truncated cones with heated air to cause them to rise, one by one to an extended end to end deployment;
    controlling the rise of the truncated cones by resistance through the cable; and
    opening the shutters to release the heated air.

7. A method of using the chimney of telescopic claim 5 involving its folding up to collapse the chimney to the ground starting from a position wherein the truncated cones are extended end to end comprising the steps of:
    pulling the cable to exert downward force on a truncated cone sufficient to lower the truncated cone to the ground; and
    repeating the pulling step until the last truncated cone is on the ground.

* * * * *